US006884843B2

(12) United States Patent
Kauffman et al.

(10) Patent No.: US 6,884,843 B2
(45) Date of Patent: Apr. 26, 2005

(54) METHOD FOR PREPARING A LAMINATE

(75) Inventors: Thomas Frederick Kauffman, Harleysville, PA (US); David William Whitman, Harleysville, PA (US)

(73) Assignee: Rohm and Haas Company, Philadelphia, PA (US)

(*) Notice: Subject to any disclaimer, the term of this patent is extended or adjusted under 35 U.S.C. 154(b) by 201 days.

(21) Appl. No.: 10/135,258

(22) Filed: Apr. 30, 2002

(65) Prior Publication Data

US 2003/0066600 A1 Apr. 10, 2003

Related U.S. Application Data

(60) Provisional application No. 60/288,657, filed on May 4, 2001.

(51) Int. Cl.$^7$ .............................. C08J 3/00; C08K 3/20; C08L 9/00; C08F 8/00; C08G 63/48
(52) U.S. Cl. .................... 525/55; 524/270; 524/272; 524/274; 524/282; 524/356; 524/474; 524/477; 524/481; 524/483; 524/500; 524/502; 524/507; 524/513; 524/529; 524/539; 524/571; 524/576; 525/107; 525/123; 525/165; 525/185; 525/193; 525/455; 525/920
(58) Field of Search ........................... 525/123, 455, 525/920, 193, 55, 107, 165, 185; 524/270, 272, 274, 282, 356, 474, 477, 481, 483, 500, 502, 507, 513, 529, 539, 571, 576

(56) References Cited

U.S. PATENT DOCUMENTS

| | | | |
|---|---|---|---|
| 4,133,731 A | 1/1979 | Hensen et al. | |
| 4,174,307 A | * 11/1979 | Rowe | 522/96 |
| 4,243,500 A | 1/1981 | Glennon | |
| 4,305,854 A | * 12/1981 | Rowe | 522/44 |
| 4,319,942 A | 3/1982 | Brenner | |
| 4,740,424 A | 4/1988 | Schumacher et al. | |
| 4,839,442 A | 6/1989 | Craig, Jr. | |
| 4,965,117 A | 10/1990 | Lautenschlaeger et al. | |
| 5,189,096 A | 2/1993 | Boutillier et al. | |
| 5,328,940 A | 7/1994 | Zimmer | |
| 5,393,818 A | 2/1995 | Masse et al. | |
| 5,418,288 A | 5/1995 | Kawasaki et al. | |
| 5,475,038 A | 12/1995 | Skoultchi | |
| 5,516,824 A | 5/1996 | Masse et al. | |
| 5,747,551 A | 5/1998 | Lewandowski et al. | |

FOREIGN PATENT DOCUMENTS

| | | |
|---|---|---|
| EP | 0 266 986 | 5/1988 |
| EP | 0 269 412 | 6/1988 |
| EP | 0 293 602 | 12/1988 |
| EP | 0342808 | 11/1989 |

OTHER PUBLICATIONS

Sartomer Company Application Bulletin 4027 (4/02),Exton, PA, "UV Curable Monomers and Oligomers is PSA Applications".
Sartomer Company Application Bulletin 4203 (2/00), Exton, PA, "New Developments in Oligomers for Ultraviolet Curable PSA Applications".
Radtech Conference Proceedings, 4/98, The Use of Acrylated Polyesters in the Formulation of Radiation Curable Adhesives, Tom Kauffman, Jim Chappell, Marga Acevedo.
Adhesives Age 12/97, pp. 29–31, Tg Region Breadth is Critical to UV–Curable PSA Performance, Craig Glotfelter, Sartomer Company, Exton, PA.

* cited by examiner

Primary Examiner—Patrick D. Niland
(74) Attorney, Agent, or Firm—Carl Hemenway

(57) ABSTRACT

A method of preparing a cured laminate employing electron beam radiation is provided. The cured laminate is prepared from an uncured laminate including a prepolymer composition containing oligomer, tackifying resin, and optionally, monomer. Also provided are a prepolymer composition and an article including the cured laminate prepared by the method of this invention. The method is useful for preparing cured laminates such as flexible laminates for food packaging.

15 Claims, No Drawings

METHOD FOR PREPARING A LAMINATE

This application claims the benefit of Provisional Application No. 60/288,657, filed May 4, 2000.

This invention relates to a method of preparing a laminate and a laminate formed thereby. In particular, the method of this invention includes forming an uncured laminate containing a prepolymer composition and curing the prepolymer composition. Further, this invention relates to a prepolymer composition. The method of this invention is useful for preparing flexible laminates useful in food packaging.

Laminates are prepared by bonding two substrates together with an interposed laminating composition. The laminating composition must adhere well to the substrates and be resistant to forces which lead to delamination. Substrates with low surface energies, such as polyethylene and polypropylene, are difficult to form into laminates as the laminating composition does not readily wet the low surface energy substrate, or otherwise has poor adhesion to the low surface energy substrate. It is also difficult to form laminates from substrates with smooth surfaces such as polyethylene terephthalate, as the laminating composition does not adhere well to the smooth surface. These low surface energy substrates or smooth surface substrates are typically modified by exposure to ultraviolet light, exposure to a corona discharge, or by chemical means to raise the surface energy of the substrate or to increase the roughness of the surface prior to the application of an adhesive composition and formation of the laminate. The art often refers to these substrates prior to treatment as "untreated" substrates, and after modification, as "treated" substrates. Methods are desired which allow the elimination of the treatment step and the formation of laminates from untreated substrates with low surface energies or smooth surfaces.

Laminates are used in the flexible food packing industry to provide packaging which is light weight, flexible, and has low permeability to oxygen and moisture to maintain food freshness. Typically, food packing laminates are formed from combinations of various polymeric films including polymeric substrates with low surface energies and metal foils bonded together by a laminating composition. It is desirable to use the laminating composition at a low application weight to minimize the weight of the laminate, maintain flexibility, and to minimize cost.

U.S. Pat. No. 5,747,551 discloses a UV curable pressure sensitive adhesive composition. The UV curable pressure sensitive adhesive composition contains a photoinitiator, a polyurethane resin with a pendant acrylate functionality, an acrylated polybutadiene component, an optional tackifier agent, and an optional acrylate monomer. The UV curable pressure sensitive adhesive composition is applied onto a substrate surface, exposed to ultraviolet radiation to initiate polymerization of the composition to provide a pressure sensitive adhesive, and then contacted with an object to adhere the substrate to the object. This reference also discloses that pressure sensitive adhesives are tacky substances which, when brought in contact with a surface under light contact exhibit sufficient cohesiveness as to resist peeling away from the surface. However, U.S. Pat. No. 5,747,551 does not disclose the use of the pressure sensitive adhesive composition as a laminating composition suitable for preparing thin flexible laminates with electron beam radiation cure.

New laminating methods are desired which allow the preparation of laminates from opaque substrates. Multilayered laminates are also desired which may be formed with a single cure step. Further, laminating methods are desired which do not require the use of compositions containing photoinitiators. Photoinitiators or the fragments of photoinitiators resulting from photolysis are generally low molecular weight materials which may adversely affect the organoleptic qualities of the packaged food.

We have discovered a method suitable for preparing a laminate which does not require a composition containing a photoinitiator. Further, the method may be used to prepare laminates from opaque substrates. The method includes the application of a prepolymer composition onto a first substrate, application of a second substrate to form an uncured laminate, and cure of the applied prepolymer composition to form a cured polymer composition. Further, the method is suitable for the preparation of laminates from untreated low energy substrates or smooth surface substrates, thus eliminating the step of treating these substrates. Furthermore, the prepolymer composition may be applied at sufficiently low application weights to allow the preparation of flexible laminates. The cured laminate prepared by this method, which contains the first substrate and second substrate bonded together by the cured polymer composition, has excellent resistance to delaminating and is suitable for use in flexible food packaging and medical packaging.

In the first aspect of this invention, a method is provided for preparing a cured laminate including the steps of: applying onto a first substrate, a prepolymer composition containing in weight percent: from 20 to 70% of at least one oligomer, wherein the oligomer has a number average molecular weight in the range of 500 to 50,000, wherein a polymer formed from the oligomer has a glass transition temperature equal to or less than −20° C.; from 30 to 70% of a least one tackifying resin, wherein the tackifying resin has a number average molecular weight less than or equal to 1500 and a softening point in the range of 65 to 150° C.; and from 0 to 40% of at least one monomer; contacting a second substrate with the prepolymer composition to provide an uncured laminate, wherein the prepolymer composition is in contact with the first substrate and the second substrate; and subjecting the uncured laminate to electron beam radiation to provide the cured laminate.

In the second aspect of this invention, an article including a cured laminate; wherein the cured laminate contains a first substrate; a second substrate; and a cured polymer composition in contact with the first substrate and the second substrate; wherein the cured polymer composition is formed from a prepolymer composition containing in weight percent: from 20 to 70% of at least one oligomer, wherein the oligomer has a number average molecular weight in the range of 500 to 50,000; wherein a polymer formed from the oligomer has a glass transition temperature equal to or less than −20° C.; from 30 to 70% of a least one tackifying resin, wherein the tackifying resin has a number average molecular weight less than or equal to 1500 and a softening point in the range of 65 to 150° C.; and from 0 to 40% of at least one monomer; wherein the cured laminate is prepared by a method comprising the steps of: applying onto the first substrate, the prepolymer composition; contacting the second substrate with the prepolymer composition to provide an uncured laminate, wherein the prepolymer composition is in contact with the first substrate and the second substrate; and subjecting the uncured laminate to electron beam radiation to provide the cured laminate.

In the third aspect of this invention, a prepolymer composition is provided containing in weight percent: from 20 to less than 50% of at least one oligomer, wherein the oligomer has a number average molecular weight in the range of 500 to 50,000; wherein a polymer formed from the oligomer has a glass transition temperature equal to or less than −20° C.; from greater than 50% to 70% of a least one tackifying resin, wherein the tackifying resin has a number average molecular weight less than or equal to 1500 and a softening point in the range of 65 to 150° C.; and from 0 to 30% of at least one monomer.

As used herein, the term "(meth)acrylate" refers to either acrylate or methacrylate, the term "(meth)acrylic" refers to either acrylic or methacrylic, and the term "(meth)acrylamide" refers to either acrylamide or methacrylamide.

"Glass transition temperature" or "$T_g$" as used herein, means the temperature at or above which a glassy polymer will undergo segmental motion of the polymer chain. The glass transition temperature of a polymer can be calculated or measured by various techniques including, for example, differential scanning calorimetry ("DSC") and dynamic mechanical analysis ("DMA"). As used herein, the $T_g$ values for the oligomers and the $T_g$ values for the cured polymer composition are measured by dynamic mechanical analysis.

The method of the present invention includes applying a prepolymer composition which contains an oligomer, a tackifying resin, and optionally, at least one monomer. The prepolymer composition is applied onto a first substrate and then a second substrate is contacted with the applied prepolymer composition to form an uncured laminate. Next, the uncured laminate is exposed to ionizing radiation to initiate polymerization of the prepolymer composition and provide a cured laminate. The cured laminate includes the first substrate, the second substrate, and a cured polymer composition in contact with both the first substrate and the second substrate.

The prepolymer composition contains an oligomer or a mixture of oligomers. The oligomer is a low molecular weight polymer containing at least two ethylenically unsaturated functionalities. In the presence of radicals or ions, the ethylenically unsaturated functionalities undergo reaction and the oligomer or the mixture of oligomers polymerizes to form a polymer. Ethylenically unsaturated functionalities include, for example, acryloxy groups, methacryloxy groups, and 1,2-vinyl groups. The polymer formed from the oligomer or the mixture of oligomers has a glass transition temperature equal to or less than −20° C. The oligomer has a number average molecular weight, $M_n$, in the range of 500 to 50,000, preferably in the range of 750 to 30,000, and more preferably in the range of 1000 to 10,000.

The prepolymer composition may contain oligomer in the range of from 20 to 70 weight %, preferably from 20 to 60 weight %, more preferably from 20 to less than 50 weight %, and most preferably from 20 to 45 weight % based on the weight of the prepolymer composition. In one embodiment, the prepolymer composition contains from 25 to 60 weight % oligomer and preferably from 30 to 60 weight % oligomer, based on the weight of the prepolymer composition.

Suitable oligomers include multifunctional (meth) acrylates obtained by reaction of a (meth)acryloxy-containing compound, such as (meth)acrylic acid, (meth) acryloyl halide, or a (meth)acrylic acid ester, with various compounds, such as hydroxy-containing alkyd resins, polyester condensates, or polyether condensates. Typical examples include:

(A) Urethane (meth)acrylates obtained by reacting isocyanate groups of a polyisocyanate, such as hexamethylene diisocyanate with a hydroxyalkyl (meth)acrylate, e.g. hydroxyethyl methacrylate. Examples of polyurethane poly (meth)acrylate oligomers are disclosed in U.S. Pat. No. 3,297,745.

(B) Polyether (meth)acrylates obtained by the esterification of hydroxy-terminated polyethers with (meth)acrylic acid as disclosed in U.S. Pat. No. 3,380,831.

(C) Polyester having at least two (meth)acrylate groups obtained by esterifying hydroxyl groups with (meth)acrylic acid as disclosed in U.S. Pat. No. 3,935,173.

(D) Multifunctional (meth)acrylates obtained by the reaction of a hydroxyalkyl (meth)acrylate, such as hydroxyethyl (meth)acrylate, with any one of: (a) dicarboxylic acids having from 4 to 15 carbon atoms, (b) polyepoxides having terminal glycidyl groups, (c) polyisocyanates having terminal reactive isocyanate groups. Multifunctional (meth) acrylates are disclosed in U.S. Pat. No. 3,560,237.

(E) (Meth)acrylate-terminated polyesters made from (meth) acrylic acid, a polyol having at least three hydroxyl groups, and a dicarboxylic acid as disclosed in U.S. Pat. No. 3,567,494.

(F) Multifunctional (meth)acrylates obtained by the reaction of (meth)acrylic acid with at least two epoxy groups of epoxidized drying oils, such as soybean oil, linseed oil, and epoxidized corresponding drying oil fatty acid, an ester, or amide thereof, or the corresponding alcohol, containing at least two epoxy groups. Such multifunctional (meth) acrylates are disclosed in U.S. Pat. No. 3,125,592.

(G) Multifunctional (meth)acrylates which are urethane or amine derivatives of the poly(meth)acrylated epoxidized drying oils, fatty acids, and epoxidized corresponding drying oil fatty acid, an ester, or amide thereof, or the corresponding alcohol, containing at least two epoxy groups. These multifunctional (meth)acrylates are obtained by the reaction of isocyanate(s) or amine(s) respectively with the poly(meth) acrylated epoxidized drying oils, fatty acids, and epoxidized corresponding drying oil fatty acid, an ester, or amide thereof, or the corresponding alcohol, containing at least two epoxy groups. The urethane and amine derivatives retain some or all of the (meth)acrylate groups and are disclosed in U.S. Pat. Nos. 3,876,518 and 3,878,077.

(H) Multifunctional (meth)acrylates obtained by reaction of (meth)acrylic acid by addition to the epoxy groups of aromatic bisphenol-based epoxy resins as disclosed in U.S. Pat. No. 3,373,075.

(I) (Meth)acrylated polybutadienes obtained by the addition of (meth)acrylic acid to a linear vinyl polymer having pendant glycidyl groups such as oligomers of glycidyl (meth)acrylate, or of vinyl glycidyl ether or vinyl glycidyl sulfide as disclosed in U.S. Pat. No. 3,530,100 or by the addition of (meth)acrylic acid to a linear vinyl polymer having pendant or terminal alcohol groups.

(J) Multifunctional (meth)acrylates derived from (meth) acrylic acid anhydride and polyepoxides as disclosed in U.S. Pat. No. 3,676,398.

(K) Multifunctional (meth)acrylate urethane esters obtained from the combining of hydroxyalkyl (meth)acrylates, a diisocyanate, and a hydroxyl functional alkyd condensate as disclosed in U.S. Pat. No. 3,673,140.

(L) (Meth)acrylate terminated urethane polyesters obtained by reaction of a polycaprolactone diol or triol with an organic polyisocyanate such as diisocyanate and a hydroxyalkyl (meth)acrylate. Such products are disclosed in U.S. Pat. No. 3,700,643.

(M) Urethane multifunctional (meth)acrylates obtained by reaction of a hydroxyl-containing ester of a polyol with (meth)acrylic acid and a polyisocyanate, such as those described in U.S. Pat. No. 3,759,809.

Examples of suitable oligomers include urethane (meth) acrylate oligomers such as Ebecryl™ 8803 oligomer (Ebecryl™ is a trademark of UCB Chemical, Co.), Ebecryl™ 230 oligomer, CN-966 oligomer (Sartomer Co.), CN-980 oligomer (Sartomer Co.); (meth)acrylated polybutadiene oligomers such as CN-301 oligomer (Sartomer Co.), CN-302 oligomer (Sartomer Co.), and CN-303 oligomer (Sartomer Co.); and 1,2 vinyl polybutadienes such as Ricon™ 150 and Ricon™ 154 (Ricon is a trademark of Ricon Resins, Inc.)

Preferred oligomers include urethane (meth)acrylates and (meth)acrylated polybutadiene oligomers.

In one embodiment, the prepolymer composition contains either a urethane (meth)acrylate oligomer wherein the prepolymer composition is substantially free of (meth)acrylated polybutadiene oligomer, or a (meth)acrylated polybutadiene oligomer wherein the prepolymer is substantially free of urethane (meth)acrylate oligomer. As used herein, the term "substantially free" refers to having the component at a level of 0 to 5 weight %, preferably to 0 to 2 weight %, more preferably 0 to 1 weight %, and most preferably 0 weight %, based on the weight of the prepolymer composition.

Oligomers containing acryloxy groups and methacryloxy groups have rapid cure speed and are preferred. Oligomer containing acryloxy groups are more preferred.

The prepolymer composition also contains a tackifying resin. The tackifying resin modifies the viscoelastic properties of the cured polymer which contains the tackifying resin. Further, the tackifying resin which is suitable as a component in the prepolymer composition has number average molecular weight less than or equal to 1500. The tackifying resin is further characterized as having a softening point in the range of 65° C. to 150° C., preferably in the range of 65° C. to 100° C., and most preferably, in the range of 65° C. to 90° C. As used herein, softening point is measured by the Ring and Ball Method according to AS™ Test Method E28-99.

Suitable tackifying resins include rosin, hydrogenated rosin, polymerized rosin, hydrogenated polymerized rosin, esters of rosin, hydrogenated esters of rosin, modified rosin esters, esters of polymerized rosin, esters of hydrogenated rosin, $C_5$ and $C_9$ hydrocarbon resins, hydrogenated dicyclopentadiene resins, hydrogenated $C_9$ resins, hydrogenated pure monomer resins, linear homopolymers of α-methyl styrene, α-pinene terpene hydrocarbon resin, aromatic modified $C_5$ hydrocarbon resin, vinyl toluene α-methyl styrene copolymer resins, β-pinene terpene resins, terpenephenolic polycyclic hydrocarbon resins, and technical hydroabietyl alcohol.

Suitable commercially available tackifying resins include hydrogenated dicyclopentadienes such as Eastotac™ H-100W resin (Eastotac is a trademark of Eastman Chemical Co.); $C_5$ and $C_9$ hydrocarbon resins such as Escorez™ 1310LC resin, Escorez™ 1580 resin, Escorez™ 2101 resin, Escorez™ 2393 resin, Escorez™ 7312 resin (Escorez is a trademark of Exxon Mobil Corp.), Norsolene S-115 resin, and Norsolene S-135 resin (Cray Valley Co.); styrenated $C_5$ hydrocarbon resins such as Escorez™ 2510 resin and Escorez™ 2596 resin; hydrogenated $C_9$ resins such as Escorez™ 5300 resin, Escorez™ 5380 resin, Escorez™ 5600 resin, Escorez™ 5690 resin, Regalite™ R-1090 resin, Regalite™ R-7100 resin, Regalite™ S-5100 resin, Regalite™ V-1100 resin, and Regalite™ 3102 resin (Regalite is a trademark of Hercules, Inc.); hydrogenated rosins and esters of hydrogenated rosins such as Foral™ 85 rosin, Foral™ NC rosin, Foral™ AX rosin, Foral™ 105 rosin, (Foral is a trademark of Hercules, Inc.)and Stabilite A rosin (Hercules, Inc.); vinyl toluene resins such as Kristalex™ 3085 resin (Kristalex is a trademark of Hercules, Inc.); rosins such as Pamite™ 90 rosin, (Pamite is a trademark of Hercules, Inc.), Resin 861 rosin (Hercules, Inc.) and Ultratac 70 resin (Arizona Chemical Co.); terpene resins such as Piccolite HM-106 resin (Hercules, Inc.); dimerized rosins such as Poly-pale™ rosin and Polyrex™ rosin (Polypale and Polyrex are trademarks of Hercules, Inc.); hydrogenated pure monomers such as Regalrez™ 3102 monomer (Regalrez is a trademark of Hercules, Inc.); terpene phenolic resins such as Sylvares™ TP-2040 resin, Sylvares™ TP-300 resin (Sylvares is a trademark of Arizona Chemical Co.), and XR-7086 resin (Arizona Chemical Co.); and aromatically modified terpene resins such as Sylvares™ ZT105 resin. Preferred tackifying resins are hydrogenated hydrocarbon resins such as Escorez™ 5300 resin and Escorez™ 5380 resin; and hydrogenated rosins and esters of hydrogenated rosins; and low hydroxyl containing terpene phenolics such as XR-7086 resin (Arizona Chemical Co.).

Preferably, the ratio of the oligomer to the tackifying resin is in the range of 1:4 to 4:1, on a weight basis.

In one embodiment, the prepolymer composition contains urethane (meth)acrylate oligomer and tackifying resin selected from hydrogenated rosin or ester of hydrogenated rosin.

In a second embodiment, the prepolymer composition contains urethane (meth)acrylate oligomer and terpene phenolic resin as a tackifying resin. In this embodiment, the tackifying resin is preferably a low hydroxyl containing terpene phenolic.

In another embodiment, the prepolymer composition contains urethane (meth)acrylate oligomer, a hydrogenated rosin, and a terpene phenolic resin.

In another embodiment, the prepolymer composition contains polybutadiene dimethacrylate oligomer, a hydrogenated rosin, and a hydrogenated aliphatic resin.

In another embodiment, the prepolymer composition contains (meth)acrylated polybutadiene oligomer and tackifying resin selected from hydrogenated rosin or ester of hydrogenated rosin.

The prepolymer composition may contain from 30 to 70 weight % tackifying resin, preferably from 40 to 70 weight %, and more preferably, from greater than 50 to 70 weight %, based on the weight of the prepolymer composition.

The prepolymer composition may optionally contain at least one ethylenically unsaturated monomer. The ethylenically unsaturated monomer, referred to herein as "monomer" has a molecular weight below 500 and may include one or more ethylenically unsaturated functionalities. The monomer may be included in the prepolymer composition as a reactive diluent in order to lower the viscosity of the prepolymer composition. The properties of the prepolymer composition or the cured polymer formed from the prepolymer composition may be modified by the addition of monomer to improve desired properties such as wetting, adhesion, or shear strength.

The prepolymer composition may contain from 0 to 40 weight % monomer, preferably from 0 to 35 weight %, and more preferably, from 0 to 30 weight %, based on the weight of the prepolymer composition. In one embodiment, the prepolymer composition contains from 5 to 40 weight % monomer and preferably from 10 to 30 weight % monomer, based on the weight of the prepolymer composition. In another embodiment, the prepolymer composition is substantially free of monomer, preferably containing 0 weight % monomer.

A wide variety of monomers or mixtures of monomers may be used in the prepolymer composition. Suitable monoethylenically unsaturated monomers include $C_1$ to $C_{40}$ alkyl esters of (meth)acrylic acid such as methyl (meth)acrylate, ethyl (meth)acrylate, butyl (meth)acrylate, 2-ethyl hexyl (meth)acrylate, isooctyl (meth)acrylate, isodecyl (meth) acrylate, lauryl (meth)acrylate, stearyl (meth)acrylate, and tridecyl (meth)acrylate; hydroxyl containing alkyl esters of (meth)acrylic acid; (meth)acrylates containing rings such as tetrahydrofurfuryl (meth)acrylate, isobornyl (meth)acrylate, and caprolactone (meth)acrylate; (meth)acrylates containing hydroxyl groups such as 2-hydroyethyl (meth)acrylate and hydroxypropyl (meth)acrylate; (meth)acrylates containing reacted ethylene oxide groups such as 2-(2-ethoxyethoxy) ethyl (meth)acrylate, 2-phenoxyethyl (meth)acrylate, ethoxylated nonyl phenol (meth)acrylate, methoxy polyethylene glycol (meth)acrylate, and ethoxylated hydroxyethyl (meth)acrylate; and (meth)acrylates with other functional groups such as glycidyl (meth)acrylate. Suitable multiethylenically unsaturated monomers include allyl (meth) acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, 1,3 butylene glycol di(meth)acrylate, 1,4-butanediol di(meth)acrylate, 1,6 hexanediol di(meth) acrylate, neopentyl glycol di(meth)acrylate, ethoxylated bisphenol A di(meth)acrylate, cyclohexane dimethanol di(meth)acrylate, dipropylene glycol di(meth)acrylate, trimethylolpropane tri(meth)acrylate, tris(2-hydroxyethyl) isocyanurate tri(meth)acrylate, pentaerythritol tri(meth) acrylate, propoxylated trimethylpropane tri(meth)acrylate, propoxylated glyceryl triacrylate, pentaerythritol tetra(meth) acrylate, and di-trimethylol propane tetraacrylate.

Other suitable monomers include functional monomers such as carboxylic acid monomers and sulfonic acid containing monomer. Functional monomers may be included in the prepolymer composition to increase adhesion of the laminating polymer composition to metal surfaces. Examples of functional monomers include carboxylic acid monomers such as (meth)acrylic acid, itaconic acid, fumaric acid, crotonic acid, maleic acid, monomethyl itaconate, monomethyl fumarate, and monobutyl fumarate, and salts thereof; phosphorus containing monomers such as allyl phosphate, mono- or diphosphate of bis(hydroxy-methyl) fumarate or itaconate, derivatives of (meth)acrylic acid esters, such as, form example, phosphates of hydroxyalkyl (meth)acrylates including 2-hydroxyethyl (meth)acrylate, 3-hydroxypropyl (meth)acrylate, phosphonate functional monomers including vinyl phosphonic acid, allyl phosphonic acid, 2-acrylamido-2-methylpropanephosphonic acid, α-phosphonostyrene, 2-methylacrylamido-2-methylpropanephosphonic acid, phosphoethyl (meth) acrylate; and sulfonic acid containing monomers such as 2-acrylamido-2-methyl-1-propanesulfonic acid and sodium vinyl sulfonate; and silicone containing monomers such as vinyl trimethoxy silane and methacryloxy propyl trimethoxy silane.

In one embodiment, the prepolymer composition contains from 20 to 45 weight % oligomer, from 55 to 70 weight % tackifying resin, and from 0 to 25 weight % of at least one monomer.

A further requirement of the prepolymer composition is that the oligomer, tackifying resin, and the optional monomer must be compatible. As used herein, compatible refers to the ability to form a uniform mixture from the components such that the components of the prepolymer composition can be mixed, applied onto a substrate, and cured before an individual component forms a separate observable phase. A compatible blend may be characterized by visual clarity and having uniform flow properties.

The cured polymer composition, which is formed from polymerization of the prepolymer composition, preferably has a glass transition temperature of 0° C. or greater, more preferably a glass transition temperature of 5° C. or greater, and most preferably a glass transition temperature of 10° C. or greater. Alternatively, the cured polymer composition preferably has a shear storage modulus, G', of greater than or equal to $5 \times 10^6$ dyne/cm$^2$ at 20° C. and at a rate of 10 radians/sec, as measured by dynamic mechanical analysis. A cured polymer composition with a glass transition temperature in this range has a high shear storage modulus at ambient conditions which provides the cured laminate with increased resistance to delaminating and with low surface tack. As the method of this invention prepares a laminate from a prepolymer composition wherein the prepolymer composition is contacted with the first substrate and the second substrate prior to cure, the cured polymer composition does not require surface tack.

The prepolymer composition may be employed to bond together substrates to form a laminate useful in food packaging. In this application, it is desirable that the prepolymer composition is substantially free of low molecular weight components, such as monomer. In this embodiment, the prepolymer composition contains from 0 to 5 weight % monomer, preferably from 0 to 2 weight % monomer, and more preferably, from 0 to 1 weight % monomer. In a preferred embodiment, the prepolymer composition does not contain monomer.

In one embodiment, the prepolymer composition contains a cationic photoinitiator which dissociates upon exposure to electron beam radiation to generate reactive species. The reactive species may initiate or accelerate the polymerization of the other reactive components of the prepolymer composition. Suitable cationic photoinitiators include but are not limited to aryldiazonium salts; diarylhalonium salts such as diaryliodonium, diarylbromonium, and diarylchloronium salts with complex metal halide anions; triarylsulfonium salts; nitrobenzyl esters; sulfones; and triaryl phosphates. In this embodiment, the prepolymer composition may contain from 0.5 to 10 weight % cationic photoinitiator, preferably 1 to 7 weight % cationic photoinitiator, and more preferably from 2 to 5 weight % cationic photoinitiator, based on the weight of the prepolymer composition.

The prepolymer composition may optionally contain adjuvants such as pigments, fillers, rheology modifiers, antioxidants, wetting agents, biocides, polymerization inhibitors, chain transfer agents, colorants such as dyes, UV stabilizers, and foam control additives Solvent may be included in the prepolymer composition. After application of the prepolymer composition to the first substrate, the solvent may be allowed to evaporate prior to the application of the second substrate. Alternatively, heat may be applied to evaporate the solvent from the applied prepolymer composition. Suitable solvents include haloalkanes such as chloroform; ethers such as ethyl ether and tetrahydrofuran; esters such as ethyl acetate; alcohols such as isopropanol and n-butanol; alkanes such as hexane and cyclopentane; ketones such as acetone; amides such as N-methylpyrrolidone; nitriles such as acetonitrile; and aromatics such as toluene. It is preferred that the prepolymer composition contains less than 5 weight % solvent, preferably less than 2 weight % solvent, and more preferably, less than 1 weight % solvent, based on the weight of the prepolymer composition. In a preferred embodiment, the prepolymer composition does not contain solvent.

The levels and the types of oligomer, tackifying resin, and the optional monomer may selected to provide prepolymer compositions with varied properties such as viscosity, ability to wet particular substrates, and cure speed. Further, the components of the prepolymer composition may be varied to obtain laminates which satisfy particular property requirements such a peel strength requirement or flexibility at a desired temperature.

The oligomer, the tackifying resin, the optional monomer, and other optional components of the prepolymer composition may be combined in any order. The various components may be combined by mixing with mixers such as a gate mixer, a paddle mixer, a sigma blade mixer; or by tumbling in a solvent. The mixing temperature is preferably below 100° C. to prevent premature polymerization of the prepolymer composition or any component of the prepolymer composition. It is desirable to include an antioxidant in the prepolymer composition when the prepolymer composition requires mixing or handling at temperature above 60° C.

The cured laminate may be prepared from various first substrates and various second substrates. Examples of substrates suitable as first substrates and second substrates include plastics such as polyethylene, polypropylene, polyethylene terephthalate, polycarbonate, acrylonitrile-butadiene-styrene (ABS), ethylene-propylene-diene rubber, polyvinyl chloride, copolymers of vinyl chloride and vinylidene chloride, copolymers of vinyl acetate with low olefins, linear polyester, polyamides, and rubber; metal foils such as aluminum, tin, lead, and copper; glass; and cellulose containing substrates such as paper, paperboard including wax-coated paperboard and polymer-coated paperboard, kraft paper, wood, and wood products such as particle board. In one embodiment, the laminate contains at least one substrate selected from polyethylene terephthalate, polyethylene, polypropylene, and polyvinyl chloride. In a second embodiment, the laminate contains at least one substrate selected from polyethylene terephthalate, polyethylene, polypropylene, and polyvinyl chloride, wherein the substrate is untreated.

The uncured laminate may be formed from a first substrate and a second substrate of any thickness provided at least one substrate allows the passage of energetic electrons to the prepolymer composition contained within the uncured laminate. Typical ranges for the thickness of a first substrate or second substrate are in the range of 5 $\mu$m to 250 $\mu$m, preferably in the range of 10 $\mu$m to 100 $\mu$m.

In one embodiment, the method of this invention is used to prepare a flexible laminate suitable for food packaging with substrates selected from a polyethylene terephthalate substrate and an aluminum foil substrate; a polyethylene terephthalate substrate and a metallized polyethylene terephthalate substrate; polyethylene terephthalate substrate and a polyethylene substrate; an oriented polypropylene substrate and an oriented polypropylene substrate; and oriented polypropylene substrate and a polyethylene substrate. In this embodiment, prepolymer composition may be applied onto either substrate, prior to contacting the prepolymer composition with the other substrate. The thickness of each substrate is typically 50 $\mu$m or less.

In a second embodiment, the cured laminate includes polyethylene terephthalate as a substrate and aluminized polyethylene terephthalate as another substrate. This laminate is suitable for use as a packaging container for liquids such as juice.

In another embodiment, the cured laminate includes oriented polypropylene as the first substrate and as the second substrate. This laminate is suitable for use as dry food packaging.

In another embodiment, the cured laminate includes oriented polypropylene as a substrate and polyethylene as another substrate. This laminate is also suitable for use as dry food packaging.

In one embodiment, the cured laminate includes at least substrate which is opaque to light. In a second embodiment, both the first substrate and the second substrate of the cured laminate are opaque to light.

In one embodiment, the cured laminate is a multilayered laminate including 3 or more substrates with the cure polymer composition in contact with the first substrate and the second substrate. Preferably, the multilayered laminate contains the cure polymer composition interposed between each adjacent laminate layer. The preparation of the multilayered laminate may involve a single cure step to polymerize the one or more layer of prepolymer composition. For example, a multilayered laminate containing three substrates may be formed from a polyethylene terephthalate substrate bonded to an aluminum foil substrate which is bonded to another polyethylene terephthalate substrate. This multilayered laminate is useful for food packaging such as bags for coffee.

Conventional application methods such as, for example, brushing, roll coating, wire-wound rod coating, knife coating, drawdown coating, dipping, gravure application, curtain coating, slot die, and spraying methods such as, for example, air-atomized spray, air assisted spray, airless spray, high volume low pressure spray, and air-assisted airless spray may be used to apply the prepolymer composition in the method of this invention.

The substrates of laminates, in particular, flexible laminates are bonded together with a thin, flexible layer of laminating adhesive. The thickness of the cure polymer composition when used as a laminating adhesive is typically in the range of 1.3 $\mu$m (0.05 mil) to 13 $\mu$m (0.5 mil) preferably in the range of 1.3 $\mu$m (0.05 mil) to 5.1 $\mu$m (0.2 mil). In contrast, the thickness of pressure sensitive adhesives are 25.4 $\mu$m (1 mil) and greater.

The uncured laminate may be cured by exposure to an accelerated electron beam, referred to herein as "electron beam radiation", or other ionizing radiation such as $\alpha$-radiation, $\beta$-radiation, $\gamma$-radiation, and neutron radiation. Exposure to ionizing radiation generates ions and other reactive species which initiate polymerization of the ethylenically unsaturated functionalities of the oligomer and the optional monomer to form the cured polymer. Levels of ionizing radiation to polymerize the prepolymer composition include doses in the range of 0.5 to 25 Mrad, preferably doses in the range of 0.5 to 15 Mrad, and more preferably in the range 1 to 10 Mrad. Alternatively, the uncured laminate may be cured by other methods known in the art to generate ions and reactive species such as radicals including, for example, heat activated initiators.

The method of preparing the cured laminate of this invention involves assembling the uncured laminate prior to the cure step. As oxygen is known in the art to inhibit the polymerization of ethylenically unsaturated monomers and oligomers, one advantage of this method is that the prepolymer composition, which is interposed between the first substrate and the second substrate, is not in direct contact with atmospheric oxygen, thus minimizing the oxygen content of the prepolymer composition. Faster cure may be obtained or a lower dosage of electron beam radiation may be used compared to cure of a composition in direct contact with atmospheric oxygen.

A further advantage of assembling the uncured laminate prior to the cure step is that the prepolymer composition may be allowed extended time to obtain maximum wetting or increased penetration of the surface of the first substrate, the surface of the second substrate, or the surfaces of both substrates. Increased wetting of a surface may improve adhesion of the cured polymer composition to that surface to provide a cured laminate with improved properties.

The number average molecular weights of the oligomer and the tackifying resin may be determined by gel permeation chromatography using tetrahydrofuran as the solvent and a polystyrene standard.

The glass transition temperature of the cured polymer composition which is formed from the prepolymer composition is measured by dynamic mechanical analysis (DMA). Samples are prepared by applying the prepolymer composition to a 50 μm (2 mil) untreated PET film with a doctor blade to give a wet film thickness of 200 μm (8 mil). A second untreated PET film is placed on top of the prepolymer composition, and smoothed in place with a rubber roller using minimal pressure. The uncured laminate is then cured by exposure to a 175 kV electron beam radiation to achieve a dose of 3 Mrads, flipped over, then exposed again for an additional 3 Mrads. Measurements are made with a Rheometrics Dynamic Analyzer 2 (Rheometrics, Inc.) using 25 mm disposable parallel aluminum plates. The sample is glued to the disposable parallel aluminum plates. The test method employs a dynamic temperature ramp over a temperature range of −20° to 120° C. with a heating rate of 2° C. per minute. The frequency of the applied deformation is 6.28 radians per second. The glass transition temperature is determined from the peak of the tan δ curve.

The following examples are presented to illustrate the invention and the results obtained by the test procedure and are not meant to limit the scope of the present invention.

The following materials were used as components of the prepolymer compositions and comparative composition:

HEMA—hydroxyethyl methacrylate
TMPTA—trimethylolpropane triacrylate
TRPGDA—tri(propylene glycol)diacrylate
Ebecryl™ 230 oligomer—acrylated aliphatic urethane oligomer with 10 wt % TRPGDA; (UCB Chemicals Corp.); $T_g$ of homopolymer=−55° C.; Mn=5000.
Ebecryl™ 811 oligomer—polyester triacrylate (UCB Chemicals Corp.). CN-302 oligomer—polybutadiene urethane diacrylate; (Sartomer Co.); $T_g$ of homopolymer=−68° C.
CN-303 oligomer—polybutadiene dimethacrylate; (Sartomer Co.); $T_g$=−70° C.
CD-501 oligomer—propoxylated trimethylol propane triacrylate; (Sartomer Co.); Mn=643.
Escorez™ 2393 tackifying resin—(Exxon Chemical Co.); softening point=93° C.
Foral™ AX tackifying resin—(Hercules, Inc.); softening point=68° C.
Foral™ NC tackifying resin—(Hercules, Inc.); softening point=70° C.
Foral™ 85 tackifying resin—(Hercules, Inc.); softening point=73° C.
Res XR-7086 tackifying resin—(Arizona Chemical Co.); softening point=95° C.
Sylvares™ PR-295 tackifying resin—(Arizona Chemical Co.); softening point=97° C.
Sylvares™ TP 2040 tackifying resin—(Arizona Chemical Co.); softening point=118° C.
Unit-Tac™ R-70 tackifying resin—(Arizona Chemical Co.); softening point=80° C.

EXAMPLE 1

Preparation of Prepolymer Composition

Oligomer, tackifying resin, and optionally, monomer were mixed together to prepare the prepolymer composition of this invention. The compositions reported in Table 1.1 and 1.2 are weight %, based on the total weight of the prepolymer composition. Also listed are the weight % of oligomer, tackifying resin, and the monomer in the composition. The prepolymer compositions in Table 1.2 do not contain monomer.

TABLE 1.1a

Components of Prepolymer Compositions and Comparative Composition

| Component | Ex. 1.1 | Ex. 1.2 | Ex. 1.3 | Ex. 1.4 | Ex. 1.5 | Ex. 1.6 | Ex. 1.7 |
|---|---|---|---|---|---|---|---|
| Ebecryl ™ 230 oligomer | 42.5 | 32.5 | 32.5 | 32.5 | 42.5 | 45 | 42.5 |
| Ebecryl ™ 811 oligomer | | | | | | | |
| CD-501 oligomer | | | | | | | |
| Foral ™ NC tackifying resin | | | | | | | |
| Foral ™ AX tackifying resin | 23 | | | | | | |
| Foral ™ 85 tackifying resin | | | | | | | |
| Sylvares ™ TP 2040 tackifying resin | 15 | | | | 57.5 | 55 | 37.5 |
| Res XR-7086 tackifying resin | | 62.5 | 57.5 | 55 | | | |
| Unit-Tac R-70 tackifying resin | | | | | | | |
| TMPTA | | | | | | | |
| HEMA | 9.75 | 5 | 10 | 12.5 | | | 15 |
| TRPGDA | 9.75 | | | | | | |
| oligomer | 38.25 | 29.25 | 29.25 | 29.25 | 38.25 | 40.5 | 38.25 |
| tackifying resin | 38 | 62.5 | 57.5 | 55 | 57.5 | 55 | 37.5 |
| monomer | 23.75 | 8.25 | 13.25 | 15.75 | 4.25 | 4.5 | 19.25 |

TABLE 1.1b

Components of Prepolymer Compositions and Comparative Composition

| Component | Ex. 1.8 | Ex. 1.9 | Ex. 1.10 | Ex. 1.11 | Ex. 1.12 | Ex. 1.13 | Ex. 1.14 |
|---|---|---|---|---|---|---|---|
| Ebecryl ™ 230 oligomer | 40 | 45 | 42.5 | 35 | 37 | 35 | 37.5 |
| Ebecryl ™ 811 oligomer | | | | | | | |
| CD-501 oligomer | | | | | | | |
| Foral ™ NC tackifying resin | | | | | | 45 | 52.5 |
| Foral ™ AX tackifying resin | | | 37.5 | | | | |
| Foral ™ 85 tackifying resin | | | | | | | |
| Sylvares ™ TP 2040 tackifying resin | | | 20 | | | | |
| Res XR-7086 tackifying resin | 42.5 | 45 | | 45 | 42 | | |
| Unit-Tac R-70 tackifying resin | | | | | | | |
| TMPTA | | | | | | | |
| HEMA | 15 | 15 | | 25 | 21 | 20 | 10 |
| TRPGDA | | | | | | | |
| oligomer | 36 | 40.5 | 38.25 | 31.5 | 33.3 | 31.5 | 33.75 |
| tackifying resin | 42.5 | 45 | 57.5 | 45 | 42 | 45 | 52.5 |
| monomer | 19 | 19.5 | 4.25 | 28.5 | 24.7 | 23.5 | 13.75 |

TABLE 1.1c

Components of Prepolymer Compositions and Comparative Composition

| Component | Ex. 1.15 | Ex. 1.16 | Ex. 1.17 | Ex. 1.18 | Ex. 1.19 | Ex. 1.20 | Comp. A |
|---|---|---|---|---|---|---|---|
| Ebecryl ™ 230 oligomer | 42.5 | 40 | 42.5 | 41.5 | 41.5 | 41.5 | 20 |
| Ebecryl ™ 811 oligomer | | 5 | | | | | |
| CD-501 oligomer | | | | | 1 | | |
| Foral ™ NC tackifying resin | | | | | | | |
| Foral ™ AX tackifying resin | | | 35 | 35 | 35 | 35 | |
| Foral ™ 85 tackifying resin | 45 | 42.5 | | | | | |
| Sylvares ™ TP 2040 tackifying resin | 12.5 | 12.5 | 17.5 | 21 | 22.5 | 22.5 | 35 |
| Res XR-7086 tackifying resin | | | | | | | |
| Unit-Tac R-70 tackifying resin | | | | | | | |
| TMPTA | | | | 2.5 | | 1 | |
| HEMA | | | 5 | | | | 45 |
| TRPGDA | | | | | | | |
| oligomer | 38.25 | 41 | 38.25 | 37.35 | 37.35 | 37.35 | 18 |
| tackifying resin | 57.5 | 57.5 | 52.5 | 56 | 57.5 | 57.5 | 35 |
| monomer | 4.25 | 4 | 4.25 | 6.65 | 4.15 | 5.15 | 47 |

TABLE 1.2

Components of Prepolymer Compositions

| Component | Ex. 1.21 | Ex. 1.22 | Ex. 1.23 | Ex. 1.24 | Ex. 1.25 |
|---|---|---|---|---|---|
| CN-302 oligomer | 45 | | | | |
| CN-303 oligomer | | 35 | 40 | 45 | 50 |
| Escorez ™ 2393 tackifying resin | | 65 | 60 | 55 | 50 |
| Sylvares ™ PR-295 tackifying resin | 55 | | | | |
| oligomer | 45 | 35 | 40 | 45 | 50 |
| tackifying resin | 55 | 65 | 60 | 55 | 50 |
| monomer | 0 | 0 | 0 | 0 | 0 |

EXAMPLE 2

Preparation of Cured Laminate

Cured laminates were prepared by applying a 20 weight % solution of the prepolymer composition in tetrahydrofuran onto a first substrate with #14 wire wound rod applicator. The coat weight of the applied prepolymer composition was 2.4 g/m² (1.5 lbs/ream), equivalent to a coating thickness of 2.4 μm. Next a second substrate was applied onto the applied prepolymer composition to prepare an uncured laminate. The uncured laminate was exposed to electron beam radiation (Electrocurtain CB175, Energy Sciences, Inc.).

In one series, laminates were prepared with untreated polyethylene terephthalate (PET) films (50 μm thickness) as the first substrate and the second substrate. In a second series, laminates were prepared with untreated PET as the first substrate and aluminum foil (75 μm thickness) as the second substrate.

EXAMPLE 3

Evaluation of Cured Laminate and Cured Polymer Composition

The T-peel test was employed to characterize the resistance to delamination of the cured laminates. The T-peel test was conducted in accordance with ASTM D1876-61T using an Instron Tensile tester (Instron Co.) in "T" mode with a speed of 30.5 cm/sec (12 inches/sec). The resistance to peel is measured over a distance of 15.2 cm (6 inches) and averaged. The average T-peel value and standard deviation (S.D.) are reported based on 4 measurements. An average T-peel value of 4 or greater is considered to be acceptable resistance to delamination of the laminate.

TABLE 3.1a

T-Peel Test Results for Untreated PET/Untreated PET Laminate

| T-Peel | Ex. 1.1 | Ex. 1.2 | Ex. 1.3 | Ex. 1.4 | Ex. 1.5 | Ex. 1.6 | Ex. 1.7 | Ex. 1.8 |
|---|---|---|---|---|---|---|---|---|
| Avg. (kg/m) | 7.25 | 7.14 | 8.10 | 4.90 | 9.33 | 10.5 | 8.75 | 9.11 |
| S.D. (kg/m) | 0.76 | 0.89 | 0.48 | 0.41 | 0.60 | 2.72 | 1.21 | 0.49 |
| Voltage (kV) | 175 | 175 | 175 | 175 | 175 | 175 | 175 | 175 |
| Dosage (Mrad) | 1.8 | 1.8 | 1.8 | 1.8 | 1.8 | 1.8 | 1.8 | 1.8 |

TABLE 3.1b

T-Peel Test Results for Untreated PET/Untreated PET Laminate

| T-Peel | Ex. 1.9 | Ex. 1.10 | Ex. 1.10 | Ex. 1.11 | Ex. 1.12 | Ex. 1.13 | Ex. 1.14 | Comp. A |
|---|---|---|---|---|---|---|---|---|
| Avg. (kg./m) | 6.80 | 6.00 | 9.49 | 7.71 | 9.45 | 8.94 | 8.86 | 0.30 |
| S.D. (kg/m) | 0.62 | | 0.43 | 0.90 | 1.62 | 0.40 | 1.05 | |
| Voltage (kV) | 175 | 175 | 130 | 175 | 175 | 175 | 175 | |
| Dosage (Mrad) | 1.8 | 1.8 | 1.8 | 1.8 | 1.8 | 3 | 3 | 1.9 |

TABLE 3.1c

T-Peel Test Results for Untreated PET/Untreated PET Laminate

| T-Peel | Ex. 1.22 | Ex. 1.23 | Ex. 1.24 | Ex. 1.25 |
|---|---|---|---|---|
| Avg. (kg./m) | 15.3 | 9.3 | 6.1 | 3.8 |
| Voltage (kV) | 75 | 175 | 175 | 175 |
| Dosage (Mrad) | 1.8 | 1.8 | 1.8 | 1.8 |
| Tg (° C.) | 23 | 19 | 10 | 3 |

TABLE 3.2a

T-Peel Test Results for Untreated PET/Aluminum Foil Laminate

| T-Peel | Ex. 1.10 | Ex. 1.10 | Ex. 1.11 | Ex. 1.12 | Ex. 1.13 | Ex. 1.14 |
|---|---|---|---|---|---|---|
| Avg. (kg/m) | 19.3 | 23.1 | 15.8 | 16.4 | 11.5 | 12.8 |
| S.D. (kg/m) | 1.5 | 0.05 | 0.36 | 1.2 | 1.2 | 0.4 |
| Voltage (kV) | 175 | 130 | 175 | 175 | 175 | 175 |
| Dosage (Mrad) | 1.8 | 1.8 | 1.8 | 1.8 | 3 | 3 |

TABLE 3.2b

T-Peel Test Results for Untreated PET/Aluminum Foil Laminate

| T-Peel | Ex. 1.18 | Ex. 1.19 | Ex. 1.20 | Comparative A |
|---|---|---|---|---|
| Avg. (kg/m) | 21.7 | 23.8 | 21.2 | "zippery" (see below) |
| S.D. (kg/m) | 0.6 | 0.3 | .04 | — |
| Voltage (kV) | 130 | 130 | 130 | |
| Dosage (Mrad) | 1.8 | 1.8 | 1.8 | 1.9 |

The laminate formed using Comparative A composition was found to be too "zippery" to characterize using the T-peel test. "Zippery" indicates that the laminate delaminated by an alternating pattern of sudden breaking of the laminate and low delaminating resistance. This behavior is indicative of a brittle sample with unacceptable delaminating resistance.

The results in Table 3.1 and Table 3.2 show the method of preparing a cured laminate of this invention provides laminates with acceptable resistance to delamination as characterized by the T-peel test. In contrast, the laminate prepared using the composition of Comparative A had unacceptable resistance to delamination. Further, the results show that the method of this invention is suitable for preparing laminates from PET film, an untreated substrate with a smooth surface.

We claim:

1. A prepolymer composition comprising in weight percent:
    a) from 20 to less than 50% of at least one oligomer, wherein said oligomer has a number average molecular weight in the range of 500 to 50,000; wherein a polymer formed from said oligomer has a glass transition temperature equal to or less than −20° C., and wherein said at least one oligomer is selected from the group consisting of:
        (i) Polyether (meth)acrylates obtained by the esterification of hydroxy-terminated polyethers with (meth)acrylic acid,
        (ii) Polyether having at least two (meth)acrylate groups obtained by esterifying hydroxyl groups with (meth)acrylic acid,
        (iii) Multifunctional (meth)acrylates obtained by the reaction of a hydroxyalkyl (meth)acrylate with dicarboxylic acids having from 4 to 15 carbon atoms or with polyepoxides having terminal glycidyl groups,
        (iv) (Meth)acrylate-terminated polyesters made from (meth)acrylic acid, a polyol having at least three hydroxyl groups, and a dicarboxylic acid,
        (v) Multifunctional (meth)acrylates obtained by the reaction of (meth)acrylic acid with at least two epoxy groups of epoxidized drying oils,
        (vi) Multifunctional (meth)acrylates obtained by reaction of (meth)acrylic acid by addition to the epoxy groups of aromatic bisphenol-based epoxy resins,
        (vii) (Meth)acrylated polybutadienes obtained by the addition of (meth)acrylic acid to a linear vinyl polymer having pendant glycidyl groups,
        (viii) Multifunctional (meth)acrylates derived from (meth)acrylic acid anhydride and polyepoxides;
    b) from greater than 50% to 70% of a least one tackifying resin, wherein said tackifying resin has a number average molecular weight less than or equal to 1500 and a softening point in the range of 65 to 150° C.; and
    c) from 0 to 30% of at least one monomer selected from the group consisting of $C_1$ to $C_{40}$ alkyl esters of (meth)acrylic acid, hydroxyl containing alkyl esters of (meth)acrylic acid, tetrahydrofurfuryl (meth)acrylate, isobornyl (meth)acrylate, caprolactone (meth)acrylate, 2-hydroyethyl (meth)acrylate, hydroxypropyl (meth)acrylate, 2-(2-ethoxyethoxy) ethyl (meth)acrylate, 2-phenoxyethyl (meth)acrylate, ethoxylated nonyl phenol (meth)acrylate, methoxy polyethylene glycol (meth)acrylate, ethoxylated hydroxyethyl (meth)acrylate, glycidyl (meth)acrylate, allyl (meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, 1,3butylene glycol di(meth)acrylate, 1,4-butanediol di(meth)acrylate, 1,6 hexanediol di(meth)acrylate, neopentyl glycol di(meth)acrylate, ethoxylated bisphenol A di(meth)acrylate, cyclohexane dimethanol di(meth)acrylate, dipropylene glycol di(meth)acrylate, trimethylolpropane tri(meth)acrylate, pentaerythritol tri(meth)acrylate, propoxylated trimethylpropane tri(meth)acrylate, propoxylated glyceryl triacrylate, pentaerythritol tetra(meth)acrylate, di-trimethylol propane tetraacrylate, (meth)acrylic acid, itaconic acid, fumaric acid, crotonic acid, maleic acid, monomethyl itaconate, monomethyl fumarate, monobutyl fumarate, allyl phosphate, mono- or diphosphate of bis(hydroxy-methyl) fumarate or itaconate, phosphates of hydroxyalkyl(meth)acrylates, vinyl phosphonic acid, allyl phosphonic acid, 2-acrylamido-2-methylpropanephosphonic acid, α-phosphonostyrene, 2-methylacrylamido-2-methylpropanephosphonic acid, phosphoethyl (meth)acrylate, 2-acrylamido-2-methyl-1-propanesulfonic acid, sodium vinyl sulfonate; vinyl trimethoxy silane, methacryloxy propyl trimethoxy silane, and mixtures thereof.

2. The prepolymer composition of claim 1 wherein a cured polymer composition formed from said prepolymer composition has a glass transition temperature greater than or equal to 10° C.

3. The prepolymer composition according to claim 1 comprising from 0 to 20% of at least one monomer.

4. The prepolymer composition according to claim 1 comprising:
    a) from 20 to 45% of said oligomer;
    b) from 55 to 70% said tackifying resin; and
    c) from 0 to 25% of at least one monomer.

5. A prepolymer composition according to claim 1 comprising from 0 to less than 10% photoinitiator.

6. A prepolymer composition comprising in weight percent:
    a) from 20 to less than 50% of at least one oligomer, wherein said oligomer has a number average molecular weight in the range of 500 to 50,000; wherein a polymer formed from said oligomer has a glass transition temperature equal to or less than −20° C.;
    b) from greater than 50% to 70% of a least one tackifying resin, wherein said tackifying resin has a number average molecular weight less than or equal to 1500 and a softening point in the range of 65 to 150° C.; and
    c) from 0 to 30% of at least one monomer,
wherein said prepolymer composition, when cured, has shear storage modulus of greater than or equal to 5,000,000 dyne/cm$^2$ at 20° C. at a rate of 10 radians/sec. as measured by dynamic mechanical analysis.

7. The prepolymer composition of claim 6 wherein a cured polymer composition formed from said prepolymer composition has a glass transition temperature greater than or equal to 10° C.

8. The prepolymer composition according to claim 6 comprising from 0 to 20% of at least one monomer.

9. The prepolymer composition according to claim 6 comprising:
 a) from 20 to 45% of said oligomer;
 b) from 55 to 70% said tackifying resin; and
 c) from 0 to 25% of at least one monomer.

10. A prepolymer composition according to claim 6 comprising from 0 to less than 10% photoinitiator.

11. A prepolymer composition comprising in weight percent:
 a) from 20 to less than 50% of at least one oligomer, wherein said oligomer has a number average molecular weight in the range of 500 to 50,000; wherein a polymer formed from said oligomer has a glass transition temperature equal to or less than –20° C.;
 b) from greater than 50% to 70% of a least one tackifying resin, wherein said tackifying resin has a number average molecular weight less than or equal to 1500 and a softening point in the range of 65 to 150° C.; and
 c) from 0 to 30% of at least one monomer,
wherein said prepolymer composition, when cured, does not have surface tack.

12. The prepolymer composition of claim 11 wherein a cured polymer composition formed from said prepolymer composition has a glass transition temperature greater than or equal to 10° C.

13. The prepolymer composition according to claim 11 comprising from 0 to 20% of at least one monomer.

14. The prepolymer composition according to claim 11 comprising:
 a) from 20 to 45% of said oligomer;
 b) from 55 to 70% said tackifying resin; and
 c) from 0 to 25% of at least one monomer.

15. A prepolymer composition according to claim 11 comprising from 0 to less than 10% photoinitiator.

\* \* \* \* \*